US 6,680,888 B2

(12) United States Patent
Toda et al.

(10) Patent No.: US 6,680,888 B2
(45) Date of Patent: Jan. 20, 2004

(54) INFORMATION RECORDING/REPRODUCING APPARATUS AND METHOD AND INFORMATION RECORDING MEDIUM

(75) Inventors: Tsuyoshi Toda, Kodaira (JP); Shigeru Nakamura, Tachikawa (JP); Takeshi Maeda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 09/971,686

(22) Filed: Oct. 9, 2001

(65) Prior Publication Data

US 2002/0015368 A1 Feb. 7, 2002

Related U.S. Application Data

(62) Division of application No. 09/752,462, filed on Jan. 3, 2001, now Pat. No. 6,304,533, which is a continuation of application No. 09/059,977, filed on Apr. 14, 1998, now Pat. No. 6,272,100.

(30) Foreign Application Priority Data

Apr. 15, 1997 (JP) .............................. 9-096909

(51) Int. Cl.$^7$ ................................ G11B 7/00
(52) U.S. Cl. ................... 369/47.51; 369/116
(58) Field of Search ............... 369/116, 47.5, 369/47.51, 47.53, 47.52, 47.54, 47.55

(56) References Cited

U.S. PATENT DOCUMENTS

| 5,029,156 A | 7/1991 | Kuehnle |
| 5,495,466 A | 2/1996 | Dohmeier et al. |
| 5,682,366 A | 10/1997 | Yamanaka et al. |
| 5,732,061 A * | 3/1998 | Kirino et al. ............... 369/116 |
| 5,732,062 A | 3/1998 | Yokoi et al. |
| 5,761,179 A | 6/1998 | Iwasaki et al. |
| 5,862,111 A | 1/1999 | Arai |
| 5,880,456 A | 3/1999 | Fasen |
| 5,898,655 A * | 4/1999 | Takahashi ................... 369/116 |
| 5,956,313 A | 9/1999 | Maegawa et al. |
| 5,974,021 A | 10/1999 | Toda et al. |
| 6,028,834 A | 2/2000 | Kuroda et al. |
| 6,058,077 A | 5/2000 | Miyaoka |
| 6,061,317 A | 5/2000 | Shodo |
| 6,414,912 B1 * | 7/2002 | Sukeda et al. ............... 369/116 |

FOREIGN PATENT DOCUMENTS

| JP | 4-10237 | 1/1992 |
| JP | 7-73466 | 3/1995 |

* cited by examiner

Primary Examiner—Nabil Hindi
(74) Attorney, Agent, or Firm—Antonelli, Terry, Stout & Kraus, LLP

(57) ABSTRACT

An information recording/reproducing apparatus includes a detector circuit for detecting a state of reflection light from the recording medium, a control circuit for calculating a radiation power used for writing the information in the recording medium, in accordance with the reflection light state, a pulse generator circuit for generating record pulse information in accordance with the radiation power, and an optical driver circuit for converting the record pulse information into optical information in accordance with the radiation power and driving the optical head to record the light information into the recording medium. Accordingly, the apparatus records information by applying light from an optical head to a record area of a recording medium and changing a state of the record area and reads the information recorded in the record area.

2 Claims, 11 Drawing Sheets

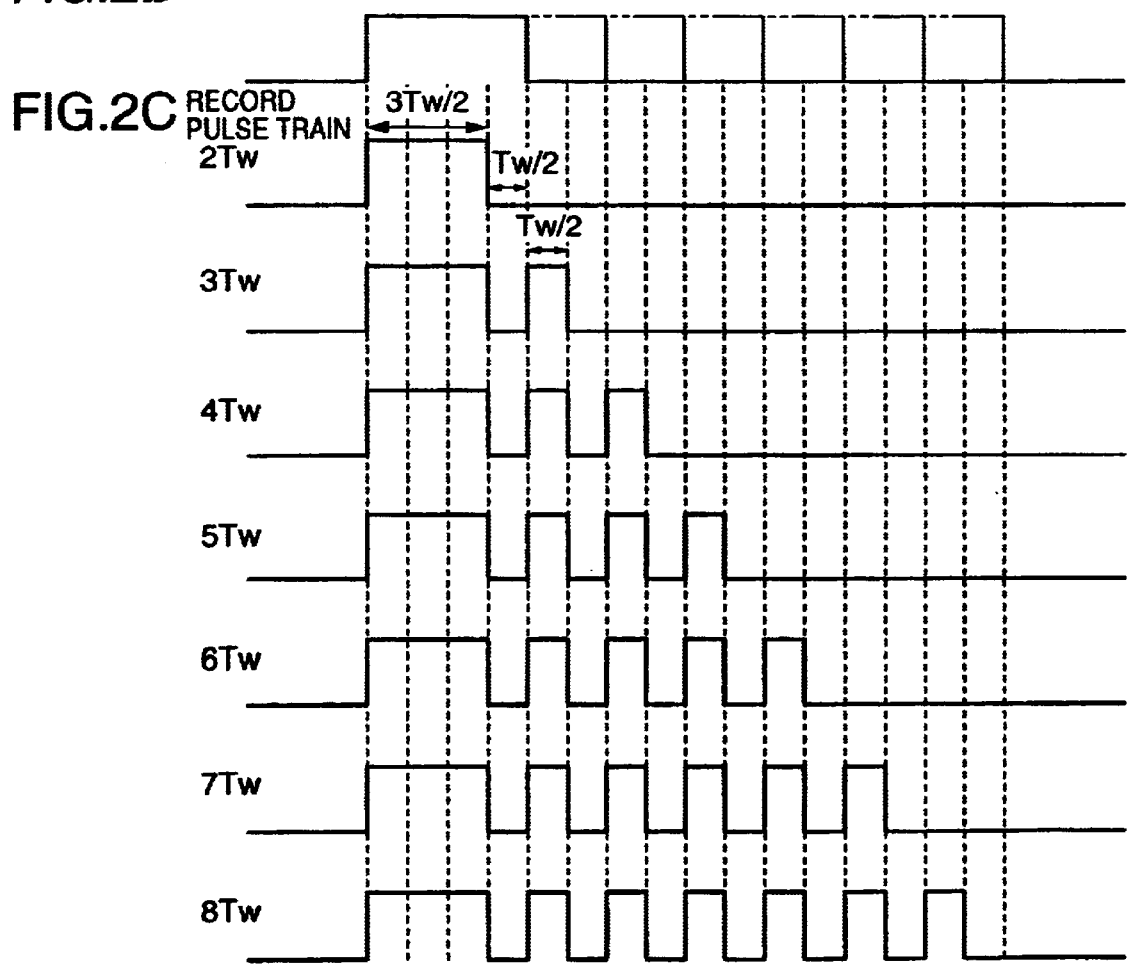

FIG.3A
RECORD WAVEFORM
LASER POWER
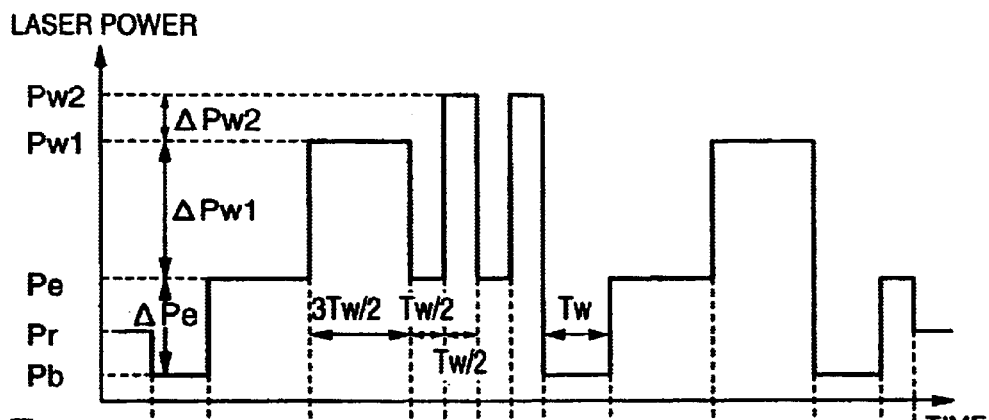
FIG.3B
CONTROL SIGNAL
RECORD GATE
RECORD PULSE TRAIN A
RECORD PULSE TRAIN B
RECORD PULSE TRAIN C
FIG.3C
SHAPES OF RECORD MARKS
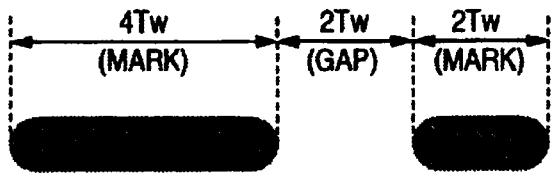

FIG.5A RECORD MARK SHAPES IN NEW RECORD AREA
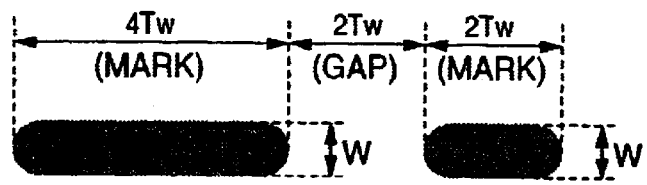
FIG.5B REFLECTION LIGHT DURING OVERWRITE
(RECORD PATTERN: 3Tw MARK, 5Tw SPACE, 2Tw MARK)
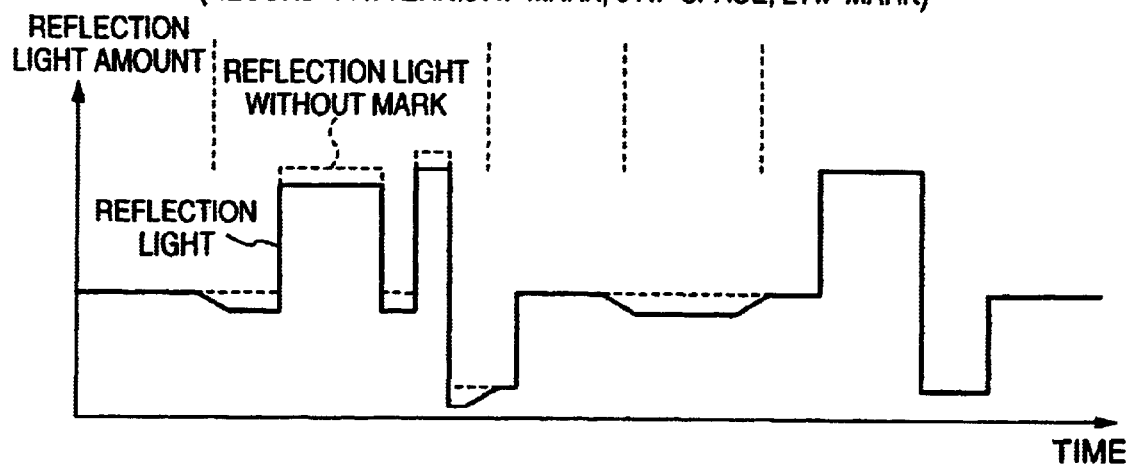
FIG.5C RECORD MARK SHAPES AFTER OVERWRITE
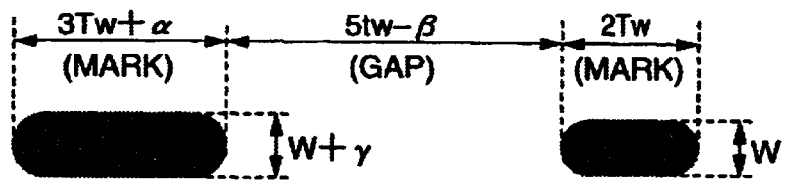

FIG.6A DATA RECORD START SIGNAL
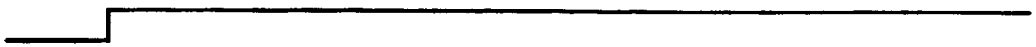
FIG.6B POWER CORRECTION START SIGNAL
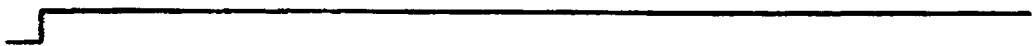
FIG.6C SAMPLE PULSE
FIG.6D REFLECTED WRITE DURING OVERWRITE
(RECORD PATTERN:3Tw MARK, 5Tw SPACE, 2Tw MARK)
SOLID LINE:WITHOUT POWER CORRECTION
DOTTED LINE:ERASE LEVEL WITH POWER CORRECTION
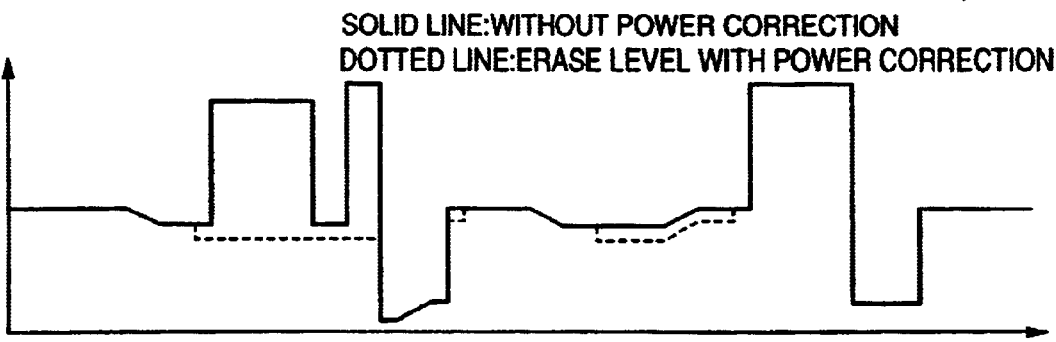
FIG.6E ERASE POWER SET VALUE DURING OVERWRITE
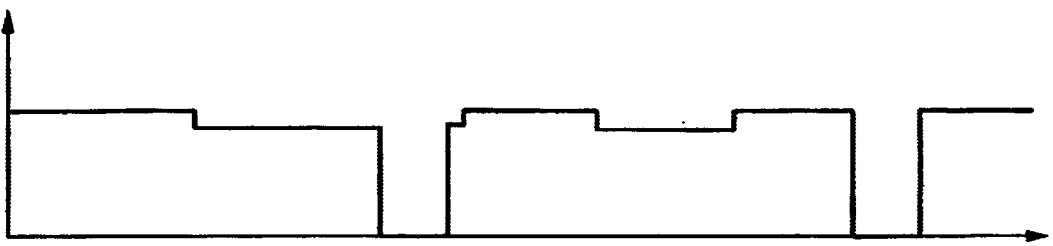
FIG.6F RECORD MARK SHAPES WITH POWER CORRECTION
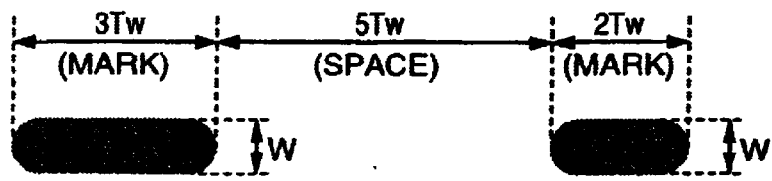

FIG. 9A DATA RECORD START SIGNAL

FIG. 9B POWER CORRECTION START SIGNAL

FIG. 9C SAMPLE PULSE A

FIG. 9D SAMPLE PULSE B

FIG. 9E OUTPUT SIGNAL FROM COMPARATOR A 104a

FIG. 9F OUTPUT SIGNAL FROM COMPARATOR B 104b

FIG. 9G CURRENT REDUCTION SIGNAL

FIG. 9H REFLECTED WRITE DURING OVERWRITE
(RECORD PATTERN: 3Tw MARK, 5Tw SPACE, 2Tw MARK)
SOLID LINE: WITHOUT POWER CORRECTION
DOTTED LINE: ERASE LEVEL WITH POWER CORRECTION
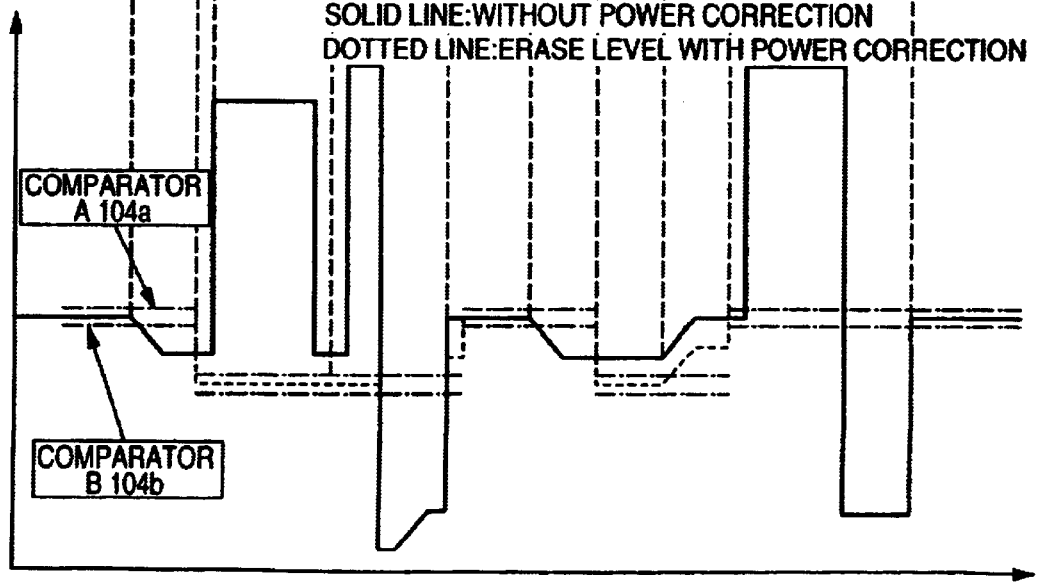

FIG.12A SHAPES OF RECORD MARKS IN TEST AREA (NON-RECORD AREA)
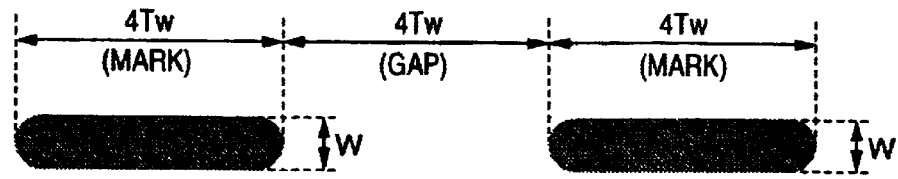
FIG.12B REFLECTION LIGHT DURING ERASURE (CONSTANT POWER RADIATION:DC ERASE)
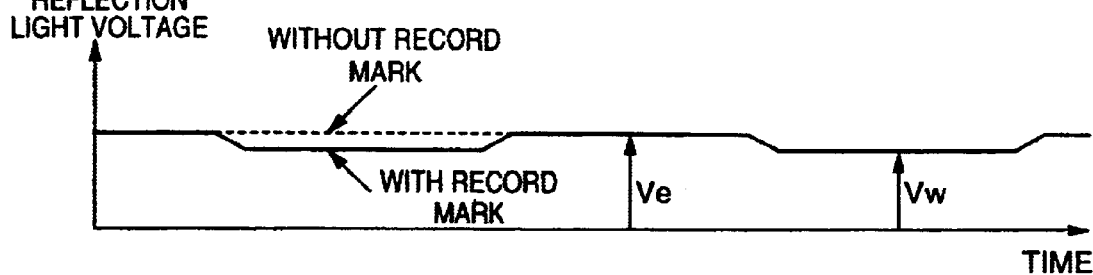
FIG.12C SAMPLE PULSE
FIG.13A SECTOR FORMAT
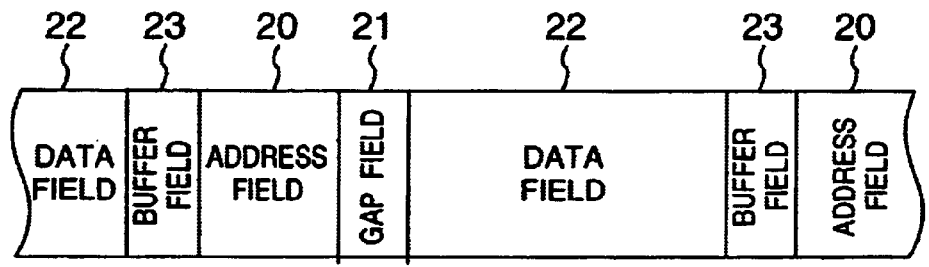
FIG.13B DATA RECORD START SIGNAL
FIG.13C POWER CORRECTION START SIGNAL
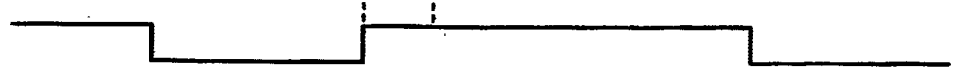

INFORMATION RECORDING/REPRODUCING APPARATUS AND METHOD AND INFORMATION RECORDING MEDIUM

CROSS REFERENCE TO RELATED APPLICATIONS

This is a divisional of U.S. application Ser. No. 09/752,462, filed Jan. 3, 2001, now U.S. Pat. No. 6,304,533, which is a continuation of U.S. application Ser. No. 09/059,977, filed Apr. 14, 1998, now U.S. Pat. No. 6,272,100, the subject matter of which is incorporated by reference herein, and copending with U.S. application Ser. No. 09/784,115, filed Feb. 16, 2001, now U.S. Pat. No. 6,445,659.

BACKGROUND OF THE INVENTION

1. Field of the Invention

The present invention relates to information recording/reproducing techniques for recording/reproducing information to/from an information recording medium, and more particularly to information recording/reproducing techniques capable of optimizing light radiation power to be used for recording information on the information recording medium, in accordance with the state of the recording medium.

2. Description of the Related Art

Optical disks and the like have already been used practically for recording/reproducing information by using laser beams. One example of rewritable optical disks is a phase change type optical disk which utilizes a reversible phase change between a crystalline state and an amorphous state. In order to obtain the amorphous state, an optical disk is heated to a melting point or higher by applying a high power (record power) and thereafter it is rapidly cooled, and in order to obtain the crystalline state, the optical disk is heated to a crystallization temperature by applying a middle power (erase power) between the high power and a read power and thereafter it is rapidly cooled. By changing the laser power in the above manner, information can be overwritten with a single laser beam. A method of setting an optimum record power when information is written upon radiation of a laser beam, is described in JP-A-7-73466 as a trial write recording control method. With this method, an optimum combination of the record power (high level) and erase power (middle power) for overwrite is decided in the following manner. Information is recorded with a record power having a constant ratio to an erase power, and by lowering the record power, the power level at which an erroneous operation during reproduction starts is detected. By changing the ratio to an erase power, the above operation is repeated. The smallest ratio of the record power to the erase power is obtained, and an operation margin is multiplied by the smallest ratio to determined the optimum record power.

SUMMARY OF THE INVENTION

It is a first object of the present invention to provide an information recording/reproducing method, an information recording/reproducing apparatus and an information recording medium capable of high density recording wherein a laser power is changed by detecting reflection light from a recording medium to suppress as much as possible the shape of each record mark from being deformed, to form a high precise record mark and to improve the reliability of data.

It is a second object of the present invention to provide an information recording/reproducing method, an information recording/reproducing apparatus and an information recording medium, capable of increasing a record data transfer speed during high precision overwrite, by switching between preset optimum powers in the record area and in the non-record area.

In order to achieve the first object of the invention, in recording data by changing the state of a record area of a recording medium by applying light, the state of the record area is detected, and in accordance with the detected state, light radiation is controlled.

In this case, the state of the record area is detected from reflection light from the recording medium, and light radiation is controlled in accordance with the n-th (n is a natural number) detected reflection light amount and the (n+1)-th detected reflection light amount. Light radiation is preferably controlled by calculating the (n+1)-th light amount from the n-th light reflection amount and comparing both the amounts.

The above operation is performed periodically or any time as desired. It is therefore possible to suppress as much as possible the shape of each record mark from being deformed, to form a high precise record mark and to improve the reliability of data.

In order to achieve the second object of the invention, prior to recording data, light radiation powers suitable for the states of record and non-record areas are calculated and the calculated radiation powers are selectively used in accordance with the state of each area. In this case, prior to recording data, a record mark and a space are formed in an area excepting the data field of a recording medium, and the light reflection amounts of the record area and non-record area are detected by using the erase power. In accordance with this detection results, at least one of the record and erase powers is preset to control the light radiation.

In this case, as different from the approach to achieve the first object, the preset power levels are switched between the record area and non-record area to perform overwrite. Therefore, it is not necessary to calculate a change ratio of the reflection light amount from the record area to that from the non-record area. Accordingly, the power level can be changed at high speed, the high precision overwrite becomes possible, and the record data transfer rate can be increased.

BRIEF DESCRIPTION OF THE DRAWINGS

FIGS. 2A to 2C show waveforms illustrating the operation of the information recording/reproducing apparatus.

FIGS. 3A to 3C are diagrams illustrating the relationship between record waveforms and record marks.

FIGS. 5A to 5C are diagrams illustrating the state of record marks after overwrite.

FIGS. 6A to 6F show waveforms illustrating an example of a power correction method according to the invention.

FIGS. 9A and 9H show waveforms illustrating another example of the power correction method according to the invention.

FIGS. 12A to 12C show waveforms illustrating another example of the power correction method according to the invention.

FIGS. 13A to 13C illustrate the relationship between the sector format of a recording medium, a data record start signal and a power correction start signal.

DETAILED DESCRIPTION OF THE PREFERRED EMBODIMENTS

Figure 1:
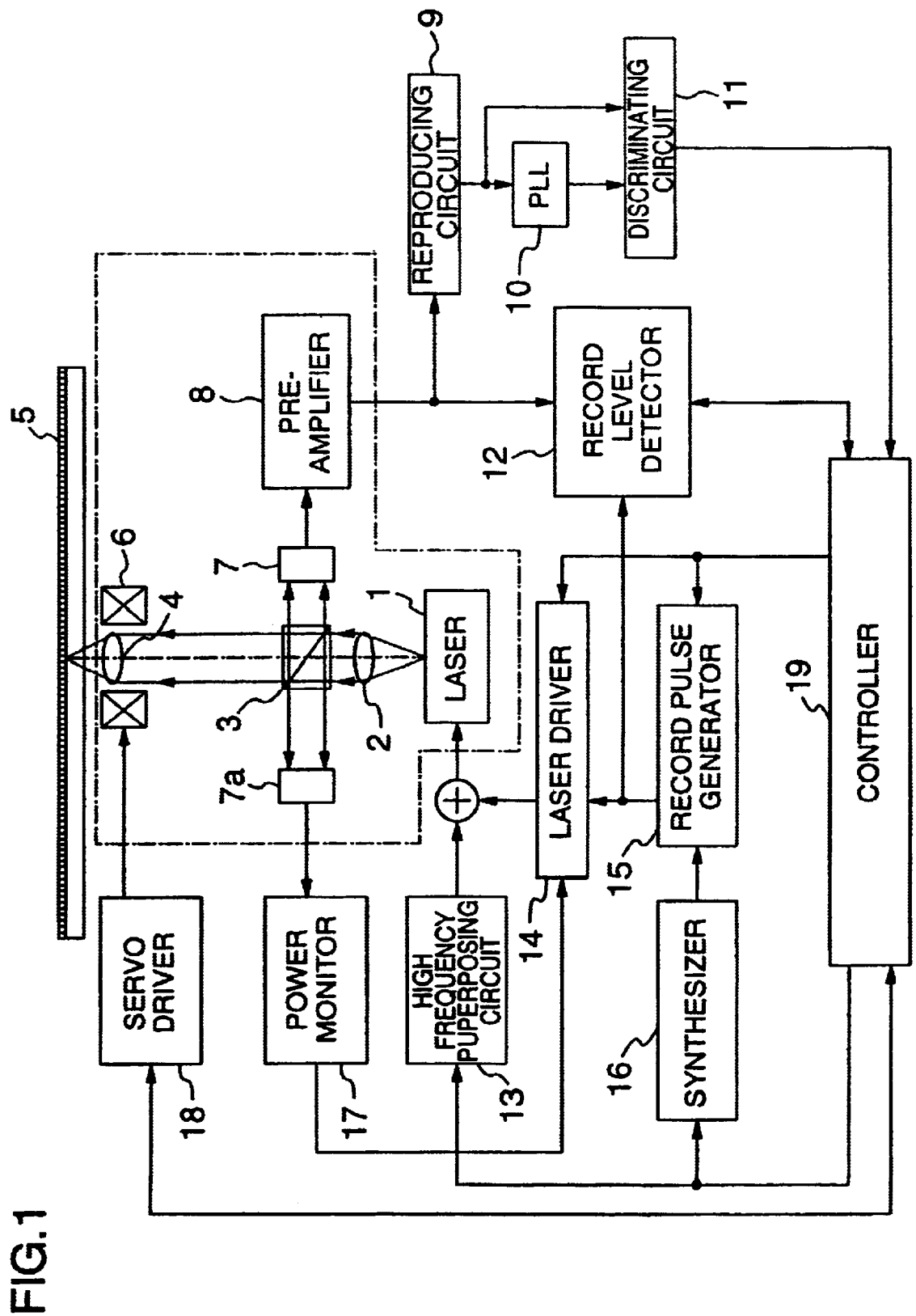
FIG. 1 is a block diagram showing the circuit of an information recording/reproducing apparatus according to the invention.

Embodiments of the invention will be described. FIG. 1 shows the structure of an information recording/reproducing apparatus according to an embodiment of the invention. Reference numeral 1 represents a laser, 2 and 4 represent a lens, 5 represents a recording medium, 7 and 7a represent a photo detector, 9 represents a reproducing circuit, 12 represents a record level detector, 14 represents a laser driver, 15 represents a record pulse generator, 17 represents a power monitor, and 19 represents a controller.

The information recording/reproducing apparatus is constituted of an optical system including the laser 1, lens 4 and the like, a record processing system including the record pulse generator 15 as its main part, and a reproducing system including the reproducing circuit as its main part for converting a signal reproduced from an optical head into a data signal. The recording medium 5 is made of a record film and a substrate for supporting the record film.

Upon reception of an instruction or record data supplied from a higher level host, the controller 19 analyzes the instruction, or modulates the record data to obtain a code train corresponding to a modulation scheme. A synthesizer 16 is an oscillator for generating a main clock of the apparatus. If a record method called ZCAV (Zoned Constant Angular Velocity) is incorporated in which a different main clock is used for each zone to make the record densities at the inner and outer circumferences generally equal and to increase the capacity of the recording medium, the oscillation frequency of the synthesizer 16 is required to be varied with each zone.

For servo control of the position of a light spot during information recording/reproducing, a focus error signal and a track error signal are obtained by using the photo detector 7 and a cylindrical lens (not shown) disposed in front of the photo detector 7. The error signals are input to the controller 19 which in turn supplies a servo signal to a servo driver 18 to drive an actuator 6 and control the position of the light spot.

For information recording, a code train modulated with record data and supplied from the controller 19 and the main clock supplied from the synthesizer 16 are input to the record pulse generator 15 which generates a record pulse train for controlling the length and width of each record mark.

The record pulse train is input to the laser driver 14 which supplies a record current to the laser 1 to generate a light beam with a high output power. The light beam from the laser 1 is made parallel by the lens 2, transmits through a prism 3, and is converged on the recording medium 5 by the lens 4 to thereby record marks corresponding to the code train. During recording, light reflected from the recording medium 5 becomes incident upon the photo detector 7 whose output is supplied via a pre-amplifier 8 to the record level detector 12.

Sample pulses of the record pulse train are input to the record level detector 12 which detects a change in the reflection light during recording and outputs it to the controller 19. In accordance with this detected change, the controller 19 calculates an optimum record power so that the laser driver 14 can operate to apply a laser beam with the optimum record power to the recording medium 5. In such a manner, since an optimum power is always set, record marks can be recorded with high precision.

A high frequency superposing circuit 13 is provided in order to reduce noises to be caused by the laser 1. From the viewpoint of a life time of the laser, high frequency superposition may be stopped during record/erase operation.

For reproduction, the laser 1 oscillates at an output power lower than that during recording, and the laser beam is applied to the recording medium 5. Light reflected from the recording medium 5 is guided to a separate optical path by the prism 3 and becomes incident upon the photo detector 7 which photoelectrically converts the reflection light. The signal output from the photo detector 7 is then amplified by the pre-amplifier 8 and input to the reproducing circuit 9 constituted of a wave equalizer, an automatic gain controller, a binarizing circuit and the like, which circuit 9 changes an input reproduction signal to a binarized signal.

The binarized signal of the reproducing circuit 9 is input to a PLL (Phase Locked Loop) circuit 10 for self-blocking which means that the basic frequency of binarized signal or data is used for a clock signal. A reproduction clock synchronized with the binarized signal obtained by the PLL circuit 10 is input to a discriminating circuit 11 for data discrimination. A data discrimination signal obtained by the discriminating circuit 11 is input to the controller 19 to demodulate data from the discrimination signal.

Next, a method of recording information on a recording medium according to an embodiment will be described with reference to FIGS. 2A to 2C. In this embodiment, a modulation method using (1, 7) RLL codes is incorporated. FIGS. 2A and 2B show record code trains modulated in accordance with the main clock supplied from the synthesizer 16 and the record data supplied from the controller 19, respectively shown in FIG. 1. These record code trains include seven trains 2Tw to 8Tw in the case of (1, 7) RLL codes, each being a NRZI (Non Return To Zero Inverse) signal which reverses its polarity at the modulation code "1" for mark length recording. Tw is a detection window width which is equal to the period Tw of the main clock supplied from the synthesizer 16.

The record pulse generator 15 generates a record pulse train (FIG. 2C) corresponding to the high level of the record code shown in FIG. 2B. The pulse width of the start pulse of the record pulse train shown in FIG. 2C is different from those of the second and following pulses, in order to prevent the width of a record mark from being varied with heat of laser radiation. The start pulse has a pulse width of 3/2 Tw shorter by 1/2 Tw than the pulse width 2Tw of the (1, 7) RLL code. The record pulse trains having the pulse width of 3Tw or longer shown in FIG. 2C have a pulse width corresponding to the first pulse 3/2 Tw and a combination of the second and following pulses 1/2 Tw and spaces 1/2 Tw (same as the main clock waveform). These pulses are generated synchronously with the main clock shown in FIG. 2A so that the precision of the pulse width and interval can be improved. The pulse width of each record pulse train shown in FIG. 2C can be set to a desired value which is an integer multiple of the period 1/2 Tw of the main clock.

FIGS. 3A to 3C show the relationship between a record waveform (FIG. 3A), control signals (FIG. 3B) and record marks (FIG. 3C). The record waveform shown in FIG. 3A is constituted of the record pulse train and gaps as shown in FIG. 2C. As shown in FIG. 3B, at the ends of the record pulse trains A and B, the record pulse train C provides a suspension or gap period having a width of Tw. Since the record pulse train C provides the gap having a certain time width (in this example, Tw) after the final end (final trailing edge of a mark forming portion) of the record pulse train A or B, heat from the final end of the record pulse train A or B can be prevented from changing the temperature at the leading edge of the next pulse train. The control signals shown in FIG. 3B are generated by the record pulse generator 15 and supplied to the laser driver 14. FIG. 3C shows record marks formed by applying the laser pulse train having the record waveform shown in FIG. 3A.

The laser power is set to five levels. As shown in FIG. 3A, the laser power has five levels, including: a reproduction power Pr; a power Pb lower than the reproduction power by an amount corresponding to a suspension of high frequency superposition during recording; an erase power Pe set by the record pulse train C; and record powers Pw1 and Pw2 set by the record pulse trains A and B. During reproduction, the power monitor 17 monitors a change in the reproduction power, and feeds back this change to the laser 1 to maintain the reproduction power Pr constant. As shown in FIG. 3A, the record waveform has a power of the start pulse 3/2 Tw set lower by $\Delta Pw2$ than the power of the succeeding pulse 1/2 Tw. In this manner, the width of the record mark formed by the preceding record pulse train is made equal to that of the record mark formed by the succeeding record pulse train, and at the same time, the record mark lengths can be controlled with high precision. In other words, the temperature at the recording medium set by the preceding record pulse train is made equal to the that set by the succeeding record pulse train so that the record mark width can be made constant. Therefore, the amplitude of a reproduction signal obtained from the recording medium becomes constant. A binarized signal can be formed by slicing the reproduction signal at the center of its amplitude or at a certain level.

Figure 4:
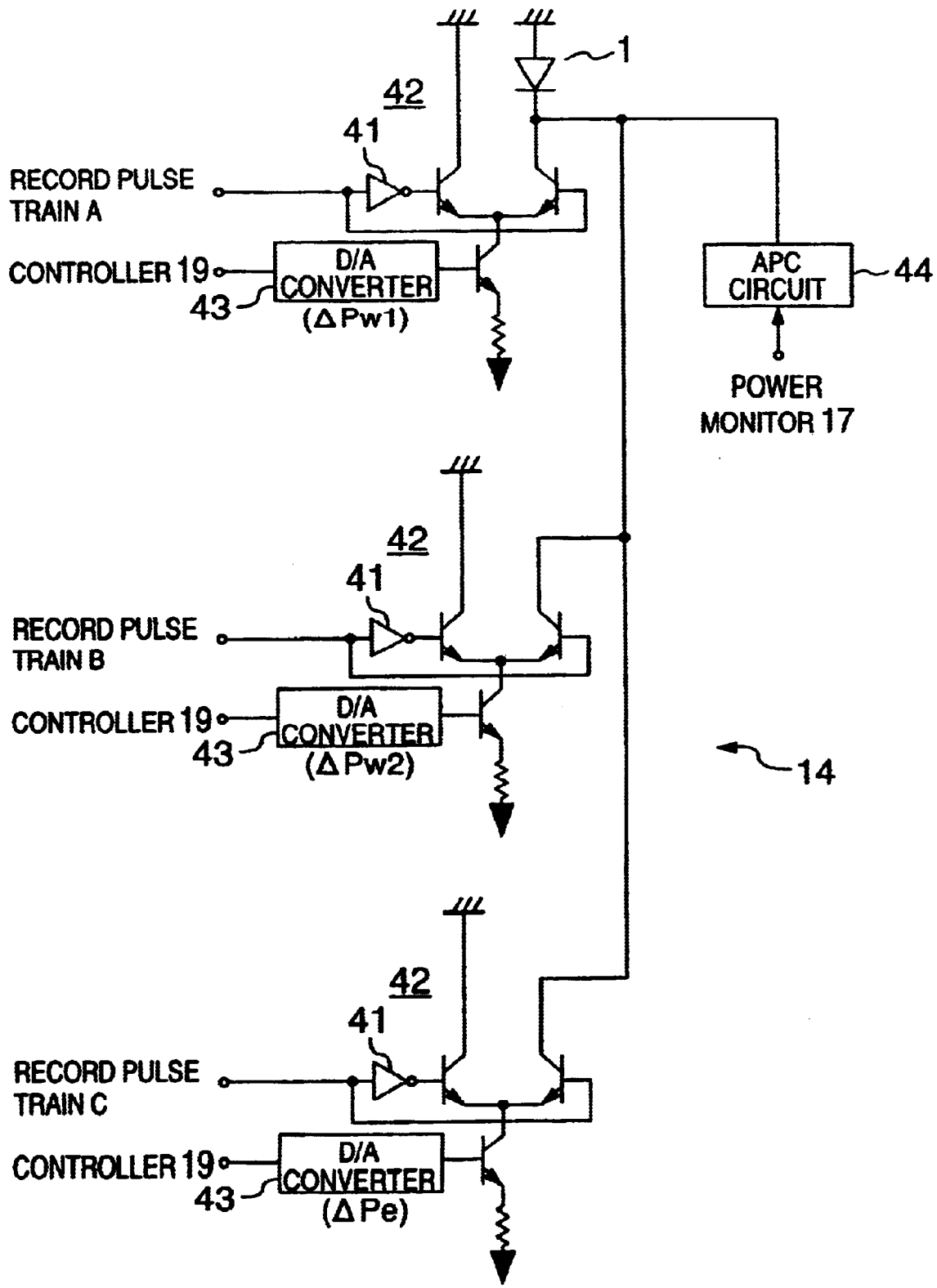
FIG. 4 is a circuit diagram of an example of a laser driver used by the information recording/reproducing apparatus according to the invention.

FIG. 4 shows the laser driver 14 for generating record marks according to an embodiment of the invention. The record pulse trains A, B and C shown in FIG. 3B are input via inverters 41 to current switches 42 which drive the pulse trains at high speed. The amount of current of each current switch 42 is controlled by the controller via each D/A converter 43. Each current amount is determined by the current/power characteristics (I-L characteristics) of the laser 1, and FIG. 3A shows the laser powers ($\Delta Pw1$, $\Delta Pw2$ and $\Delta Pe$) applied to the recording medium 5. In response to the on/off of each recording pulse train A, B, C, current flows through the laser 1 and the record waveform shown in FIG. 3A can be obtained. An APC (Auto Power Controller) circuit 44 controls a current to be supplied to the laser 1 in accordance with an instruction from the power monitor 17.

For comparison with the present invention, the shapes of record marks formed by a conventional technique will be described with reference to FIGS. 5A to 5C. FIG. 5A shows the shapes of record marks recorded on a recording area of a recording medium, FIG. 5B shows the amount of light reflected from the recording medium during overwrite, and FIG. 5C shows the shapes of record marks overwritten on the recording medium with the record marks shown in FIG. 5A. In a phase change type optical disk, generally the crystalline state corresponds to a non-record or erase state and the amorphous state corresponds to a record state. The length and width of each record mark shown in FIG. 5A are highly precise. Light absorption is large in the amorphous region (mark) and small in the crystalline region (space), so that the amount of reflection light reduces in the mark region as indicated by a solid line in FIG. 5B. The broken line indicates the amount of reflection light if the mark is not recorded and the region is in a non-record or erase state. Therefore, as new record marks are overwritten, the length of the mark becomes long by $\alpha$ and the width becomes wide by $\gamma$, as shown in FIG. 5C, lowering the reliability of data.

FIGS. 6A to 6F illustrate power correction for record marks to be overwritten, In the example shown in FIGS. 6A to 6F, the power correction is performed by using the erase power Pe. A new record pattern (a mark length 3Tw, a space length 5Tw, and a mark length 3Tw) is overwritten on a recording medium with the record pattern (a mark length 4Tw, a space length 2Tw, and a mark length 2Tw) already written. FIG. 6A shows a data record start signal. When this signal rises, new data is recorded. FIG. 6B shows a power correction start signal used immediately before data record for generating a corrected erase power.

The timing when the power correction start signal is generated will be described with reference to FIGS. 13A to 13C. The recording medium 5 is written with data in the sector format such as shown in FIG. 13A. An address field 20 is an area for storing a physical address of the pre-recorded sector of the disk, and a data field 22 is an area for storing data. A gap field 21 is provided between the address field 20 and data field 22, as a switching area to the record operation after the record sector is confirmed by the address field 20. A buffer field 23 is an area for absorbing a shift in the data field to be caused by a rotation variation of the recording medium 5 during recording.

FIG. 13B shows the data record start signal (corresponding to FIG. 6A) in response to which the data record in the data field starts. FIG. 13C shows the power correction start signal (corresponding to FIG. 6B) which is generated at the start of the gap field 21 before the data field 22 and terminated at the end of the data field 22.

The reason why the power correction start signal is set up before the data record start signal is as follows. Since the gap field 21 is not written with data, it is always in a non-record state. Therefore, even if the erase power is applied to this field, a reflection factor in the non-record state (crystalline state) can be obtained always.

Returning back to the description of FIGS. 6A to 6F, FIG. 6C shows sample pulses used for detecting light (FIG. 6D) reflected from the recording medium. These sample pulses can be generated easily by using the main clock and record pulse trains generated by the record pulse generator 15.

The sample pulses shown in FIG. 6C is generated from the main clock shown in FIG. 2A and the record pulse trains A and C of the control signals shown in FIG. 3B. Specifically, the sample signals shown in FIG. 6C are generated by the record pulse generator 15 shown in FIG. 1 as logical products of inverted signals of the main clock shown in FIG. 2A and a logical product of the record pulse trains A and C. The pulse width of the sample pulse can be set as desired.

In this embodiment, the sample pulses are used for detecting a level of the erase power Pe shown in FIG. 3A. Sample pulses for detecting the record power level can also be formed easily from the main clock and record pulse trains driving the laser driver 14. Sample pulses for detecting levels of the record powers Pw1 and Pw2 can be formed in a similar manner from the main clock and record pulse trains A and B.

As above, by using sample pulses generated from the main clock (FIG. 2A) and record pulse trains (FIG. 3B), the levels of the erase and record powers can be easily detected.

FIG. 6D shows the amount of reflection light during overwrite. The reflection light in a conventional method is indicated by a solid line, whereas the erase level after power correction is indicated by a broken line. FIG. 6E shows the corrected erase power level during overwrite, and FIG. 6F shows the shapes of record marks with power correction.

The power correction operation will be described. In response to the power correction start signal shown in FIG. 6B, only the erase power Pe shown in FIG. 3A is applied to the recording medium 5. By using the first sample pulse shown in FIG. 6C, the reflection light level is detected in the non-record or erase state to obtain the relationship between the radiated power and the reflection light level (voltage from the pre-amplifier 8) to predict the reflection light level to be detected by the next sample pulse shown in FIG. 6C. The predicted reflection light level is compared with that measured by using the next sample pulse. The power is changed in accordance with a change ratio of the measured value to the predicted value. The above operations are repeated for each sample pulse shown in FIG. 6C. Namely, the (n+1)-th predicted value calculated from the n-th measured value is compared with the (n+1)-th measured value, and the power is changed in accordance with its change ratio. In this manner, even if there are marks already recorded, the shape of a new mark becomes generally the same as that of a mark recorded in a non-record area.

Figure 7:
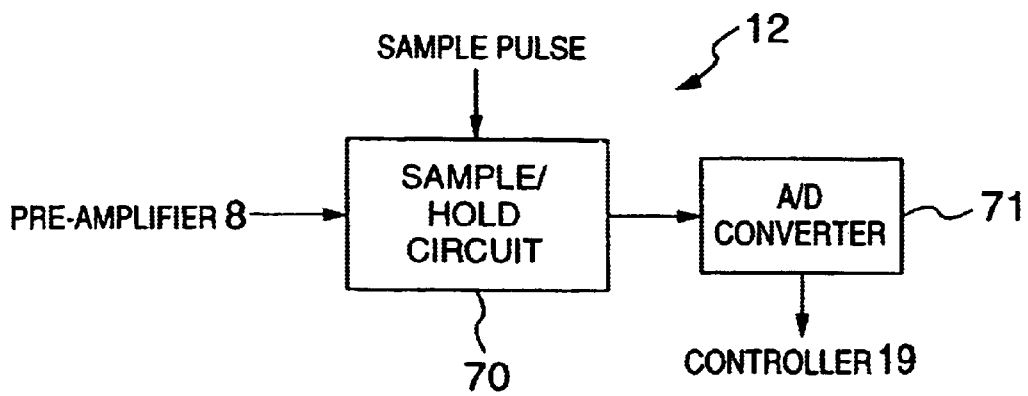
FIG. 7 is a block diagram showing an example of a record level detector used by the information recording/reproducing apparatus according to the invention.

FIG. 7 shows the record level detector 12 according to an embodiment of the invention. The record level detector 12 is constituted of a sample/hold circuit 70 and an A/D converter 71. A voltage converted from reflection light by the photo detector 7 is amplified by the pre-amplifier 8 to have a predetermined level and input to the sample/hold circuit 70. This voltage held by the sample/hold circuit 70 in response to the sample pulse (FIG. 6C) is supplied to the A/D converter 71. The converted digital voltage is supplied to the controller 19.

Figure 8:
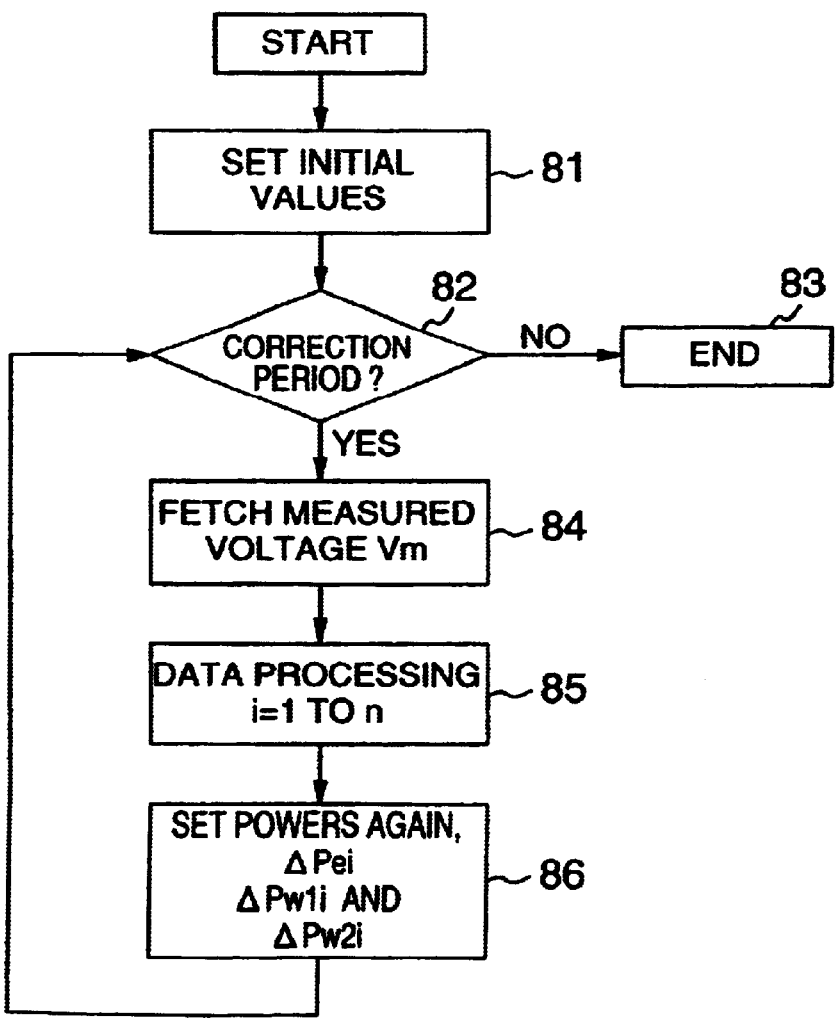
FIG. 8 is a flow chart illustrating the operation of a power correction method used by the information recording/reproducing apparatus according to the invention.

FIG. 8 is a flow chart illustrating the operation of a program for a power correction method. This power correction program is executed by the controller 19. In response to the power correction start signal (FIG. 6B), initial values are set at step 81. This step corresponds to a setting program of the power correction program. The initial values include the i-th (first) measured voltage $(Vm)_i$, a ratio $(Km)_i=1$ to a predicted voltage $(Vs)_1$, correction powers $\delta Pe$, $\delta Pw1$ and $\delta Pw2$ (=0), and reference powers $\Delta Pe$, $\Delta Pw1$ and $\Delta Pw2$. The reference powers are optimum record powers set by the controller 19. Next, it is checked at step 82 whether the power correction period continues. If in the power correction period, the power correction method continues, whereas if not, it is terminated at step 83. These steps correspond to a check program of the power correction program. During the power correction period, the controller 19 fetches the measured voltage Vm (reflection light level) at each sample pulse (FIG. 6C) at step 84 to perform the following processes 1 to 5 at step 85. This step corresponds to a correction value calculation program of the power correction program.

Process 1: a ratio Ks of the erase power $\Delta Pe$ to a reference voltage Vs is calculated.

$Ks=Vs/\Delta Pe$, if $i=1$, $Vs=(Vs)_i=(Vm)_i$ (this calculation is performed only for the first sample pulse, or before the data record start)

Process 2: a ratio $(Km)_{i+1}$ of a measured voltage $(Vm)_{i+1}$ to a predicted voltage $(Vs)_{i+1}$ is calculated.

(for $(i+1)$-th sample pulse)

$(Vs)_{i+1}=Ks\times(\Delta Pe)_i$ $(Km)_{i+1}=(Vm)_{i+1}/(Vs)_{i+1}$

If $i=1$, $(Vs)_i=Vs$ and $(\Delta Pe)_i=\Delta Pe$

Process 3: correction powers $(\delta Pe)_{i+1}$, $(\delta Pw1)_{i+1}$ and $(\delta Pw2)_{i+1}$ are calculated.

$(\delta Pe)_{i+1}=((Km)_{i+1}-1)\Delta Pe$ if $i=1$, $(\delta Pe)_i=0$ $(\delta Pw1)_{i+1}=((Km)_{i+1}-1)\Delta Pw1$ if $i=1$, $(\delta Pw1)_i=0$ $(\delta Pw2)_{i+1}=((Km)_{i+1}-1)\Delta Pw2$ if $i=1$, $(\delta Pw2)_i=0$ Process 4: corrected powers $(\Delta Pe)_{i+1}$, $(\Delta Pw1)_{i+1}$ and $(\Delta Pw2)_{i+1}$ are calculated.

$(\Delta Pe)_{i+1}=\Delta Pe+(\delta Pe)_{i+1}$ if $i=1$, $(\Delta Pe)_i=\Delta Pe$ $(\Delta Pw1)_{i+1}=\Delta Pw1+(\delta Pw1)_{i+1}$ if $i=1$, $(\delta Pw1)_i=\Delta Pw1$ $(\Delta Pw2)_{i+1}=\Delta Pw2+(\delta Pw2)_{i+1}$ if $i=1$, $(\Delta Pw2)_i=\Delta Pw2$ Process 5: the powers are set again.

In the above processes 1 to 5, the process 1 is performed immediately after the power correction starts to calculate the ratio Ks of the power to the reference voltage for calculation of the predicted voltage Vs. The ratio Ks of the power to the voltage is a ratio in the non-record state (crystalline state) wherein the erase power is applied to the non-record area before the data record starts, this area being always in the non-record state (crystalline state). It is therefore always possible to calculate the ratio Ks in the non-record state (crystalline state).

In the processes 2 to 5, data obtained by the (i+1)-th sample pulse is used together with data obtained by the i-th sample pulse at the process 1. At the process 2, the (i+1)-th predicted voltage (Vs) is calculated as a product of the i-th $\Delta Pe$ and the ratio Ks to calculate the ratio $(Km)_{i+1}$ of the measured voltage $(Vm)_{i+1}$ to the predicted voltage $(Vs)_{i+1}$. In this case, the measured voltage is lower than the predicted voltage if light is applied to the area with the record mark, because of a different light absorption. Therefore, the change ratio is reflected upon the record and erase powers to lower the powers and eliminate a different light absorption. If the area has no record mark, the measured voltage and predicted voltage are equal so that the power is not necessary to be changed. This operation is performed at the processes 3 and 4, and the new power set at the process 5 is supplied to the laser driver 14.

Why it is necessary to calculate the predicted voltage will be described. The measured voltage becomes lower than the predicted voltage not only by the presence of a record mark but also by a corrected power set upon detection of the record mark. Therefore, if there is a record mark which extends over a plurality of sample pulses (FIG. 6C), the power is lowered at each sample pulse by the power correction method, so that an optimum power cannot be calculated. However, since the ratio Km of the measured voltage to the predicted value is used, this problem can be solved. Specifically, if the record mark is already present, the ratio Km smaller than "1" is used to lower the corrected power than the initial power, whereas if there is no record mark, i.e., the non-record state (crystalline state), the ratio Km=1 is used so that the correction power becomes zero and the initially set reference power is used as the corrected power. In this manner, by incorporating the predicted voltage, it becomes possible to discriminate between the record state and non-record state and set an optimum power.

After the data record starts, the above processes 2 to 5 are repeated so that a record mark can be formed with high precision. In the above description, the power is corrected by detecting a change in the reflection light amount by using the erase power. It is also possible to correct the power by detecting a change in the reflection light amount by using the record power level Pw1, Pw2. In this case, the sample pulses can be generated from the main clock and the record pulse train A, and the predicted voltage can be calculated as a product of the ratio Ks calculated at the process 1 and a reference power $\Delta Pw1$, $\Delta Pw2$. Also in this case, although there is a different light absorption factor, the processes similar to the above are performed to obtain an optimum record power.

If the frequency of the main clock is set higher (e.g., an integer multiple of the main clock), the period of the sample pulses can be shortened so that the power can be corrected more precisely. In this embodiment, the reflection light amount is detected and the power is corrected at each sample pulse. Instead of sample pulses, the voltage may be monitored at all times in an analog manner to correct the power in accordance with the voltage change. In this case, it is obvious that marks can be formed more precisely.

Next, the power correction method according to another embodiment of the invention will be described. In the embodiment shown in FIGS. 6A to 6F and FIG. 8, the controller 19 is used for realizing a high precision power correction. In this embodiment, power can be corrected with a more simplified circuit structure, assuming that the light absorption factor of an area with a record mark is known in advance.

Figure 10:
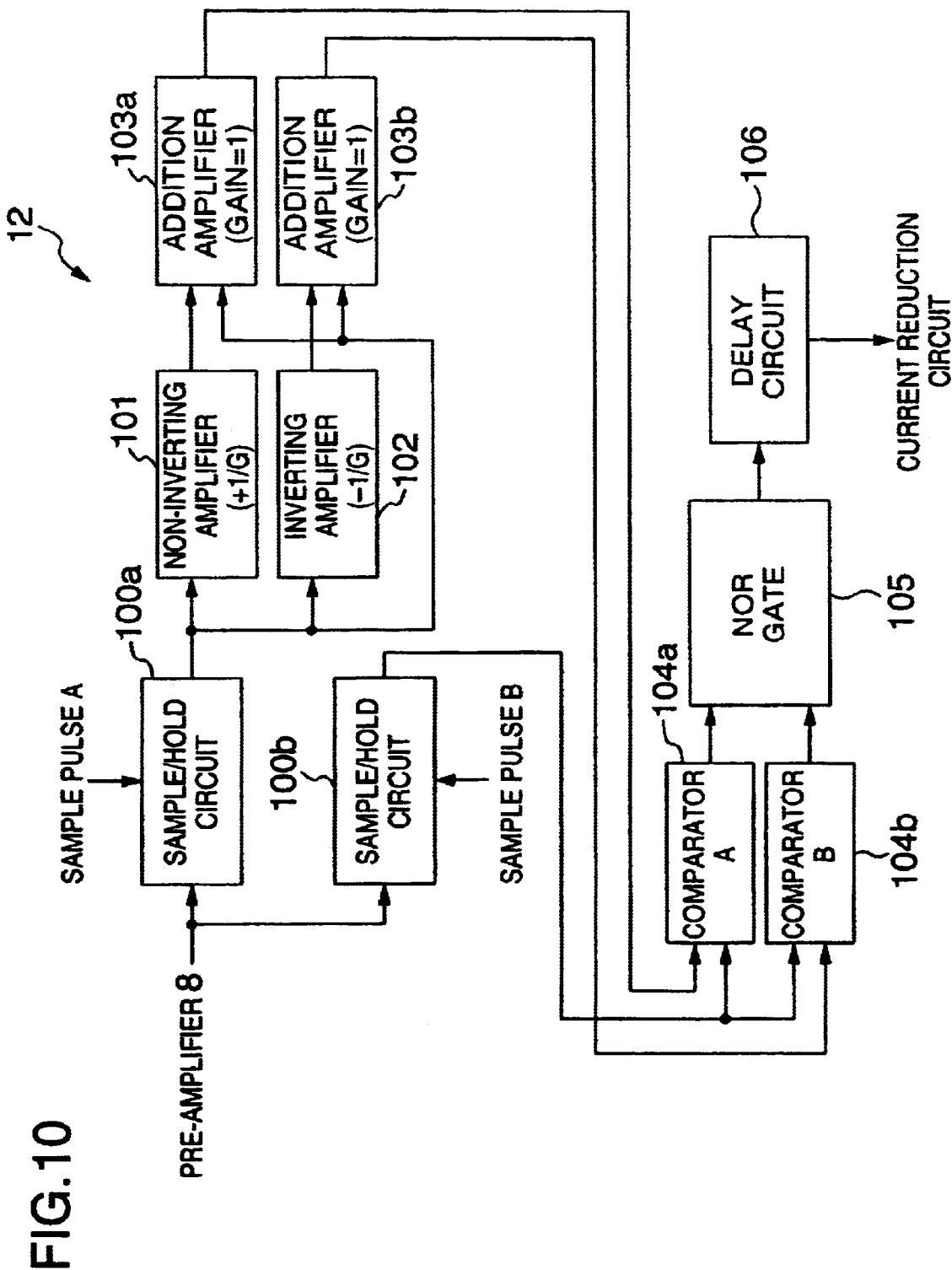
FIG. 10 is a block diagram showing another example of the record level detector used by the information recording/reproducing apparatus according to the invention.

The signals shown in FIGS. 9A and 9B are the same as those shown in FIGS. 6A and 6B. In this embodiment, two types of sample pulses A and B are used as shown in FIGS. 9C and 9D to detect a light absorption difference between the mark and space. At each sample pulse A, the reflection light amount is detected by using a newly set erase power, and at each sample pulse B, the reflection light amount is detected by using an erase power set before its newly set erase power. Immediately before data is recorded (from the power correction start signal to the data record start signal), the sample pulses A and B may be generated at the same timings. The reflection light level detected by using the sample pulse A is used as a reference level. In order to detect a light absorption difference between the mark and space, positive and negative levels smaller in absolute value than the level change to be caused by a light absorption difference are added to the reference level to obtain two levels which are set to comparators 104a and 104b (FIG. 10). The comparators 104a and 104b compare the set levels with the level detected by using the sample pulse B.

The levels set to the comparators 104a and 104b are shown in FIG. 9H together with the reflection light during overwrite. The solid line in FIG. 9H shows the reflection light amount without power correction, and the broken line shows the erase level with power correction. In accordance with the signals output from the comparators 104a and 104b, a current reduction signal shown in FIG. 9G is obtained. This current reduction signal is supplied to the laser driver 14 to change the power. The reflection light level detected at each sample pulse A by using a newly set erase power is compared with the reflection light level detected at the next sample pulse B. If the latter level exceeds the level set to the comparator 104b, it can be judged that the light absorption is in the area of the mark so that the power is lowered, whereas if it exceeds the level set to the comparator 104a, it can be judged that the light absorption is in the area of the space so that the power is increased.

FIG. 10 shows the record level detector 12 according to another embodiment of the invention. An output of the pre-amplifier 8 is input to two sample/hold circuits 100a and 100b operating in response to the sample pulses A and B shown in FIGS. 9C and 9D. A level sampled and held in response to the sample pulse A is supplied to a non-inverting amplifier 101 and to an inverting amplifier 102 having the gains of +1/G (G is an optional constant) and −1/G to generate the positive and negative levels smaller than in absolute value than the level to be caused by a light absorption difference. These levels and the level detected in response to the sample pulse A are supplied to two addition amplifiers 103a and 103b having the gain "1" or the same gain, the outputs from the amplifiers 103a and 103b being set to the comparators 104a and 104b as reference levels.

A level detected in response to the sample pulse B is supplied to the comparators 104a and 104b whose outputs are supplied to a NOR circuit 105. Only when the two outputs of the comparators 104a and 104b have the "low" level, the current reduction signal takes the "high" level, and in other cases, it takes the "low level". This signal is delayed by a delay circuit 106 by a time corresponding to the sample pulse. If the current reduction signal takes the "high level", the power applied to the recording medium is lowered, whereas if it takes the "low level", the power is set to the initial value so that the power can be changed at the non-record area and at the record area.

Figure 11:
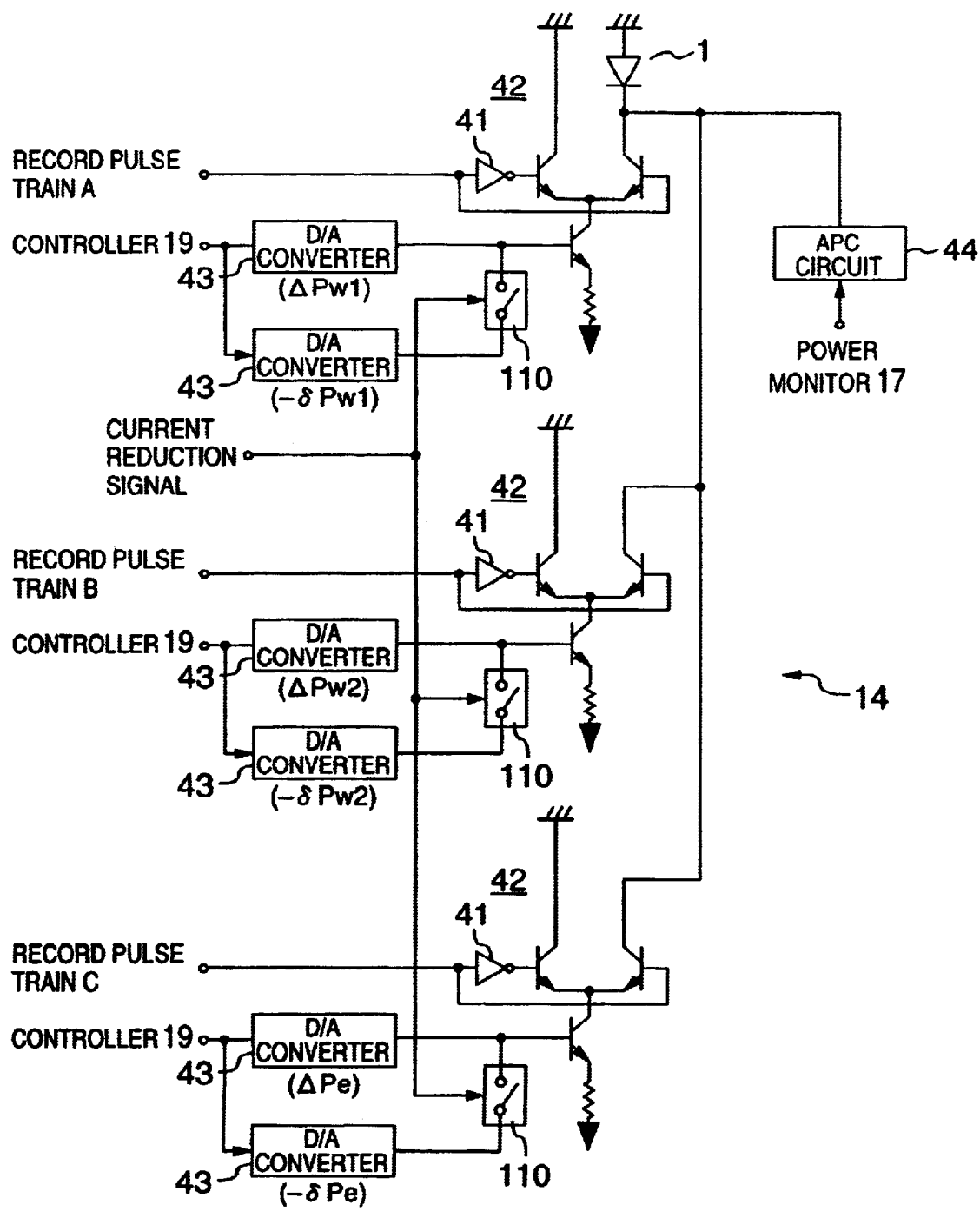
FIG. 11 is a circuit diagram showing another example of the laser driver used by the information recording/reproducing apparatus according to the invention.

FIG. 11 shows the laser driver 14 for generating a record waveform according to another embodiment of the invention. Although the fundamental operation is the same as the laser driver 14 shown in FIG. 4, the controller 19 sets beforehand the reference powers and corrected powers lowered by the amount corresponding to light absorption for each record pulse train. The current reduction signal described with FIG. 10 is used for turning on and off the switches 110. If the current reduction signal takes the "low level", the switches 110 are opened so that the reference powers $\Delta Pw1$, $\Delta Pw2$ and $\Delta Pe$ shown in FIG. 3A are output, whereas if the current reduction signal takes the "high level", the switches 110 are closed so that the corrected powers $\Delta Pw1-\delta PW1$, $\Delta Pw2-\delta Pws$ and $\Delta Pe-\delta Pe$ are output which are lowered by an amount corresponding to light absorption. Like parts to those shown in FIG. 4 are represented by using identical reference numerals, and the description thereof is omitted.

With the above operations, the power can be corrected at high speed with simplified circuit structure. Therefore, the reliability of data can be improved and data can be recorded at high transfer speed.

A method of measuring beforehand light absorption factors according to an embodiment of the invention will be described. Referring to FIG. 12A, a repetitive pattern of, for example, a mark length 4Tw and a space length 4Tw is recorded in a test area (an area excepting the data field) of a recording medium at powers of ΔPw1, ΔPw2 and ΔPe shown in FIG. 3A. This test area is in the non-record state and a record mark can be recorded correctly without being affected by a light absorption factor. FIG. 12B shows a reflection light obtained by applying a constant power ΔPe (DC erase power) to the record marks and space. The solid line indicates the reflection light with the record mark, and the broken line indicates the reflection light without the record mark. The level of the reflection light is detected at each sample pulse shown in FIG. 12C. The record level detector is similar to that shown in FIG. 7. The measured level with the record mark is Ve and that without the record mark is Vw. The corrected powers (δPe, δPw1 and δPw2 are calculated from the reference powers ΔPe, ΔPw1 and ΔPw2 as in the following:

$$\delta Pe = \Delta Pe \times Vw/Ve$$

$$\delta Pw1 = \Delta Pw1 \times Vw/Ve$$

$$\delta Pw2 = \Delta Pw2 \times Vw/Ve$$

The corrected powers lowered by the amount corresponding to light absorption used in FIG. 11 can be easily set as described above. If these levels are detected before the record operation, a variation of light absorption factors of recording media can be detected so that a compatibility between recording media can be improved.

In the above embodiments of the invention, a change in the reflection light level is detected by using the erase power. This change can also be detected by using the record power to perform the above-described power correction method. It is therefore possible to detect the change in the reflection light level by using both the erase and record powers to correct the power. Namely, if at least one of the erase power Pe and record powers Pw1 and Pw2 is corrected, the change in the shape of the record mark can be suppressed. The more the change can be suppressed, the more the number of powers to be corrected is increased.

In the above embodiments, the power correction program shown in FIG. 8 is stored in the controller 19 to execute it. Instead, the program may be stored in a storage medium. When new record marks are recorded in a recording medium, i.e., when new data is recorded, the program is read from the storage medium into the controller 19 to execute it. The controller 19 therefore has at least a storage device for storing the program and a processing unit for executing the program.

The power correction method of the embodiment used when record marks are recorded, particularly when record marks are overwritten, can obviously be applied to both when data is written in the center of the record mark and when data is written along the boarder of the record mark.

What is claimed is:

1. An information recording and reading apparatus for recording information by changing a state of a recording area on an information recording medium with a light irradiated by an optical head, comprising:

a recording pulse generating circuit for generating a recording pulse;

a laser driver for driving the optical head in response to the recording pulse;

a detection circuit for detecting a reflective light state of the recording area; and a controller for controlling an irradiation power of the light in response to the reflective light state to record information on the information recording medium by the laser driver, wherein the controller controls an irradiation light in accordance with a first detected reflective light amount without recording on the recording area and a second detected reflective light amount with information recorded thereon so as to chance the irradiation power of the irradiation light in accordance with an already recorded state of the recording area while detecting a mark during the recording of information in the recording area;

wherein the controller changes the irradiation light when overwriting on a part of the information recording medium where the mark is present on the information recording medium; and wherein the controller decreases the irradiation power of the light when overwriting on a part of the information recording medium where the mark is present on the information recording medium.

2. A method of recording information by changing a state of a recording area on an information recording medium with a light irradiated by an optical head, comprising the steps of:

(a) irradiating a light on the recording area;

(b) detecting a first reflective light amount from the recording area without recording and a second reflective light amount from the recording area with information recorded; and (c) controlling an irradiation power of the light in response to a reflective light state of the recording area so as to change the irradiation power of the light in accordance with an already recorded state of the recording area while detecting a mark during the recording of information in the recording area;

wherein said step (c) includes a step of changing the irradiation power of the light when overwriting on a part of the information recording medium where the mark is present on the information recording medium; and wherein said step (c) includes a step of decreasing an irradiation power of the light when overwriting on the part of the information recording medium where the mark is present on the information recording medium.

* * * * *